United States Patent
Beppu et al.

(10) Patent No.: US 11,689,295 B2
(45) Date of Patent: Jun. 27, 2023

(54) RECEPTION APPARATUS AND NON-TRANSITORY COMPUTER READABLE MEDIUM

(71) Applicants: KDDI CORPORATION, Tokyo (JP); NEC Platforms, Ltd., Kawasaki (JP)

(72) Inventors: Shohei Beppu, Fujimino (JP); Takehiro Tsuritani, Fujimino (JP); Koji Igarashi, Fujimino (JP); Masahiro Shigihara, Kawasaki (JP); Masahiro Kikuta, Kawasaki (JP)

(73) Assignees: KDDI CORPORATION, Tokyo (JP); NEC Platforms, Ltd., Kawasaki (JP)

( * ) Notice: Subject to any disclaimer, the term of this patent is extended or adjusted under 35 U.S.C. 154(b) by 0 days.

(21) Appl. No.: 17/682,355

(22) Filed: Feb. 28, 2022

(65) Prior Publication Data

US 2022/0190930 A1 Jun. 16, 2022

Related U.S. Application Data

(63) Continuation of application No. PCT/JP2020/033997, filed on Sep. 8, 2020.

(30) Foreign Application Priority Data

Sep. 18, 2019 (JP) ................................. 2019-169498

(51) Int. Cl.
*H04B 10/06* (2006.01)
*H04B 10/61* (2013.01)
*H04B 10/63* (2013.01)

(52) U.S. Cl.
CPC ....... *H04B 10/6164* (2013.01); *H04B 10/612* (2013.01); *H04B 10/63* (2013.01)

(58) Field of Classification Search
CPC .............. H04B 10/6164; H04B 10/616; H04B 10/2507; H04B 10/40; H04B 10/6161;

(Continued)

(56) References Cited

U.S. PATENT DOCUMENTS

2010/0119241 A1* 5/2010 Yang .................. H04B 10/6971
398/208
2012/0155887 A1* 6/2012 Youn .................. H04L 27/2692
398/208

(Continued)

FOREIGN PATENT DOCUMENTS

CN 103312645 A 9/2013
JP 2014-220570 A 11/2014

(Continued)

OTHER PUBLICATIONS

J. Zhu et al, "RF-Pilot Phase Noise Compensation for Long-Haul Coherent Optical OFDM Systems", IEEE 14th Canadian Workshop on Information Theory (CWIT), 2015, 4 pages.

(Continued)

*Primary Examiner* — Hanh Phan
(74) *Attorney, Agent, or Firm* — Foley & Lardner LLP (57) ABSTRACT

A reception apparatus includes: a receiving unit configured to coherently detect an optical signal and output an electrical signal containing a modulated signal and a pilot signal; a first compensating unit configured to detect a frequency of the pilot signal by performing a DFT of the electrical signal, and determine and compensate for frequency error in the electrical signal based on a reference frequency; a frequency converting unit configured to convert the frequency of the pilot signal after the compensating such that the frequency of the pilot signal is lowered by the reference frequency; and a second compensating unit configured to determine frequency error in the modulated signal after the compensating by performing a DFT on the pilot signal after the frequency converting and detecting a frequency of the pilot signal after the frequency converting.

9 Claims, 5 Drawing Sheets

(58) Field of Classification Search
CPC ............ H04B 10/6162; H04B 10/6163; H04B 10/6165; H04B 10/612; H04B 10/63; H04B 10/0795; H04B 10/077
USPC ....... 398/202, 208, 209, 204, 205, 206, 207, 398/135, 136, 158, 159, 30, 31, 32, 33, 398/38, 137, 138, 139, 25, 26, 27
See application file for complete search history.

(56) References Cited

U.S. PATENT DOCUMENTS

| | | |
|---|---|---|
| 2014/0328588 A1 | 11/2014 | Sakai et al. |
| 2015/0098713 A1 | 4/2015 | Abe et al. |
| 2015/0155947 A1 | 6/2015 | Watanabe |
| 2016/0248615 A1 | 8/2016 | Wang et al. |
| 2017/0054513 A1* | 2/2017 | Guo .................. H04B 10/6164 |

FOREIGN PATENT DOCUMENTS

| | | |
|---|---|---|
| JP | 2017-011501 A | 1/2017 |
| WO | WO-2018/198873 A | 11/2018 |
| WO | WO-2019/171587 A1 | 9/2019 |

OTHER PUBLICATIONS

B. Tang et al, "Low Complexity Carrier Frequency Offset Estimation Scheme Based on Zoom-FFT for M-QAM", OECC/PSC 2019, TuB2-5, 2019, 3 pages.
Supplementary European Search Report for corresponding EP Patent Application No. 20864715.6 dated Oct. 21, 2022 (13 pages).

* cited by examiner

RECEPTION APPARATUS AND NON-TRANSITORY COMPUTER READABLE MEDIUM

CROSS-REFERENCE TO RELATED APPLICATION(S)

This application is a continuation of International Patent Application No. PCT/JP2020/033997 filed on Sep. 8, 2020, which claims priority to and the benefit of Japanese Patent Application No. 2019-169498 filed on Sep. 18, 2019, the entire disclosures of which are incorporated herein by reference.

BACKGROUND OF THE INVENTION

Field of the Invention

The present invention relates to a frequency compensation technique in a reception apparatus of a coherent optical communication system.

Description of the Related Art

One method for increasing the transmission rate in a coherent optical communication system is to increase the multi-value level of the modulation scheme used. In a coherent optical communication system, the reception apparatus performs demodulation by compensating for a frequency difference between the light source of the reception apparatus and the light source of the transmission apparatus (hereinafter referred to simply as a "frequency difference"). Here, increasing the multi-value level reduces the permissible range of frequency error that remains even after the frequency compensation ("residual error" hereinafter). In other words, increasing the multi-value level also increases the accuracy of frequency compensation required of the reception apparatus.

NPL 1 discloses a configuration in which continuous light is added as a pilot light to modulated light carrying information in a transmission apparatus, and a reception apparatus performs frequency compensation on the basis of this pilot light. Specifically, the reception apparatus disclosed in NPL 1 coherently receives an optical signal including the modulated light and the pilot light using local light generated by its own light source, performs a discrete Fourier transform on the resulting electrical signal to detect the frequency of a signal component corresponding to the pilot light, determines the frequency difference, and performs frequency compensation on the signal component corresponding to the modulated light.

However, with a modulation scheme having a high multi-value level, the maximum value of the permissible range of residual error is approximately 100 kHz, and in order to keep the residual error within the permissible range, the size of the discrete Fourier transform ("FFT size" hereinafter) must be about $10^5$, which is difficult to process in real time.

Meanwhile, NPL 2 discloses a configuration in which the frequency difference is determined and compensated for by using a fourth power method and zoom FFT. Specifically, NPL 2 discloses a configuration in which the frequency difference is determined and compensated for by determining an approximate frequency difference by raising the modulated signal to the fourth power, determining the frequency range on the basis of the approximate frequency difference determined, and applying the zoom FFT of the determined frequency range to the modulated signal raised to the fourth power.

NPL 1: J. Zhu et al, "RF-Pilot Phase Noise Compensation for Long-Haul Coherent Optical OFDM Systems", IEEE 14th CWIT, 2015

NPL 2: B. Tang et al, "Low Complexity Carrier Frequency Offset Estimation Scheme Based on Zoom-FFT for M-QAM", OECC 2019, TuB2-5, 2019

In the configuration of NPL 2, the FFT size can be suppressed by applying the zoom FFT after raising the modulated signal to the fourth power. However, the fourth power method becomes unstable when the optical communication system contains a large amount of noise.

SUMMARY OF THE INVENTION

According to one aspect of the present disclosure, a reception apparatus includes: a receiving unit configured to coherently detect, based on local light, an optical signal containing modulated light and pilot light, and output an electrical signal containing a modulated signal corresponding to the modulated light and a pilot signal corresponding to the pilot light; a first compensating unit configured to detect a frequency of the pilot signal by performing a discrete Fourier transform of the electrical signal output by the receiving unit, and determine and compensate for frequency error in the electrical signal based on error in the frequency detected relative to a reference frequency; a frequency converting unit configured to convert the frequency of the pilot signal after the compensating by the first compensating unit such that the frequency of the pilot signal is lowered by the reference frequency; and a second compensating unit configured to determine frequency error in the modulated signal after the compensating by the first compensating unit by performing a discrete Fourier transform on the pilot signal after the frequency converting and detecting a frequency of the pilot signal after the frequency converting, and compensate for the frequency error in the modulated signal after the compensating by the first compensating unit.

According to the present invention, frequency compensation can be performed accurately in a reception apparatus.

Other features and advantages of the present invention will be apparent from the following description taken in conjunction with the accompanying drawings. Note that the same reference numerals denote the same or like components throughout the accompanying drawings.

DESCRIPTION OF THE EMBODIMENTS

Embodiments will be described hereinafter in detail, with reference to the accompanying drawings. It should be noted that the following embodiments are not intended to limit the scope of the appended claims, and that not all the combinations of features described in the embodiments are necessarily essential to the invention. Two or more of the plurality of features described in the embodiments may be combined as desired. Additionally, the same or similar configurations are given the same reference signs, and redundant descriptions thereof will be omitted. Furthermore, constituent elements not necessary for the descriptions of the embodiments have been omitted from the drawings.

First Embodiment

Figure 1:
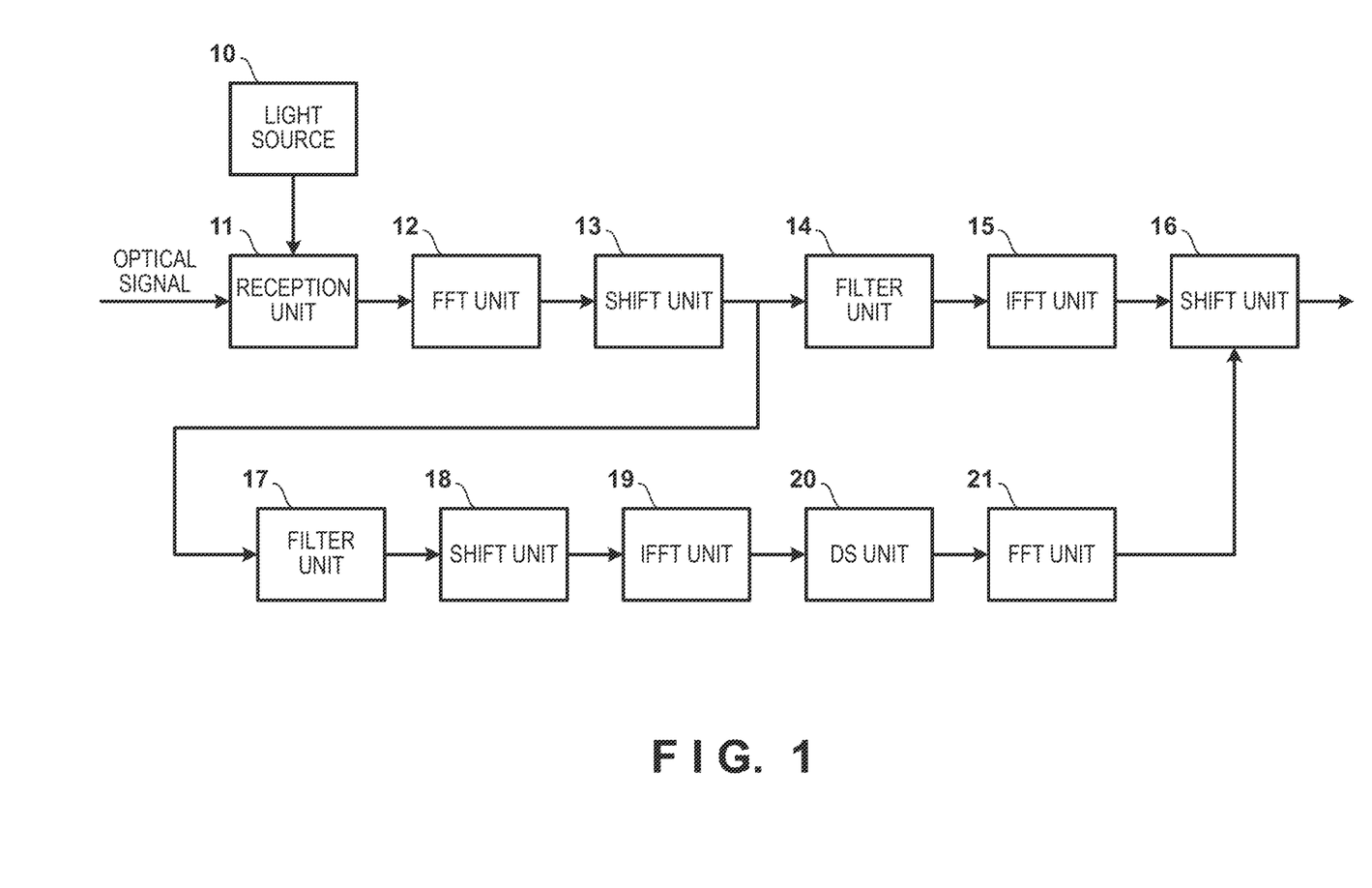
FIG. 1 is a block diagram of a reception apparatus according to an embodiment.
Figure 2A:
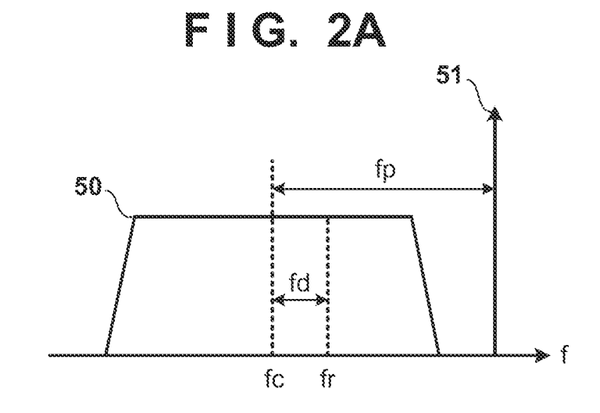
FIG. 2A is a diagram illustrating a signal at each of positions in the reception apparatus according to an embodiment.

FIG. 1 is a block diagram of a reception apparatus according to the present embodiment. In the present embodiment, a transmission apparatus adds pilot light to modulated light carrying information, and transmits an optical signal including the modulated light and the pilot light. FIG. 2A illustrates the optical signal transmitted by the transmission apparatus and received by the reception apparatus. The optical signal includes modulated light 50 and pilot light 51. Note that a center frequency of the modulated light is assumed to be fc, and the frequency of the pilot light is assumed to be higher than fc by fp. Note also that as illustrated in FIG. 2A, although the frequency of the pilot light 51 is higher than that of the modulated light 50 in present embodiment, the configuration may be such that the frequency is lower.

A light source 10 of the reception apparatus generates local light and outputs the local light to a reception unit 11, and the reception unit 11 performs coherent detection on the basis of the local light and outputs an electrical signal. Note that although the reception apparatus is assumed to perform homodyne detection in the present embodiment, the present invention can also be applied to heterodyne detection. Because homodyne detection is used, the light source 10 should ideally generate continuous light having a frequency fc equal to the center frequency of the modulated light 50. In practice, however, the frequency of the continuous light generated by the light source 10 does not match the center frequency fc of the modulated light 50. In the present example, the frequency of the continuous light generated by the light source 10 is assumed to be a frequency fr that is higher than the ideal frequency fc by fd, as illustrated in FIG. 2A.

Figure 2B:
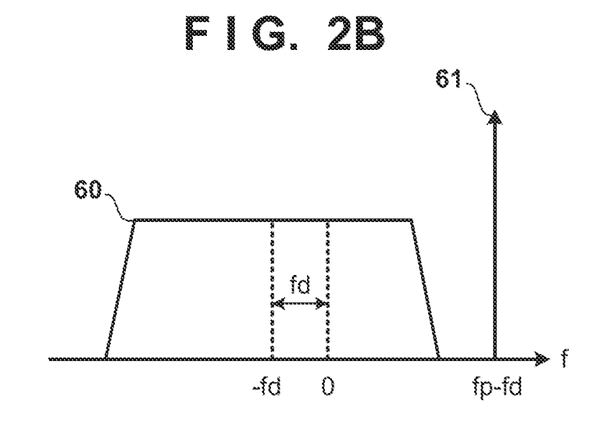
FIG. 2B is a diagram illustrating a signal at each of positions in the reception apparatus according to an embodiment.

FIG. 2B illustrates the electrical signal output by the reception unit 11. The electrical signal includes a modulated signal 60 corresponding to the modulated light 50 and a pilot signal 61 corresponding to the pilot light 51. If the frequency of the continuous light generated by the light source 10 is the ideal fc, the center frequency of the modulated signal 60 will be 0, and the frequency of the pilot signal 61 will be fp. However, in the present example, the frequency of the continuous light generated by the light source 10 is higher than the ideal frequency fc by fd, and thus the center frequency of the modulated signal 60 will be −fd and the frequency of the pilot signal 61 will be fp−fd, as illustrated in FIG. 2B. In other words, the modulated signal 60 will contain frequency error fd corresponding to the frequency difference between the light source of the transmission apparatus and the light source 10.

An FFT unit 12 samples the electrical signal output by the reception unit 11 at a sampling rate S1, performs a discrete Fourier transform, and outputs a discrete frequency sample. Note that a lower limit value of the sampling rate S1 is determined by the sampling theorem on the basis of the highest frequency of the frequency components of the electrical signal output by the reception unit 11.

A shift unit 13 detects the frequency of the pilot signal 61 from the frequency sample output by the FFT unit 12, determines the error in the detected frequency relative to the ideal pilot signal 61 frequency fp, and compensates for the detected error by shifting the frequency sample on a frequency axis. Note that the amplitude of the pilot signal 61 is greater than the amplitude of the modulated signal 60, and thus the shift unit 13 detects the frequency of the frequency sample having the greatest amplitude as the frequency of the pilot signal 61. The ideal pilot signal 61 frequency fp (reference frequency) is stored in advance in a storage unit (not shown) of the reception apparatus.

Here, assume, for example, that there is no error in the frequency of the pilot signal 61 detected by the shift unit 13 and that the shift unit 13 can move the frequency sample on the frequency axis by any desired frequency. In this case, the shift unit 13 detects the frequency fp−fd as the frequency of the pilot signal 61, i.e., determines that the error of the pilot signal 61 is −fd, and therefore shifts the signal illustrated in FIG. 2B such that the signal increases by the frequency fd. Through this, the shift unit 13 can compensate for the frequency error in the modulated signal 60.

However, because the frequency samples are discrete on the frequency axis, error arises in the frequency of the detected pilot signal 61. Note that the frequency interval between the frequency samples output by the FFT unit 12 is S1/N1, where N1 represents the FFT size in the FFT unit 12. Note also that S1 represents the sampling rate in the FFT unit 12, as described above. It is necessary that the shift processing by the shift unit 13 be performed in units of the frequency interval of the frequency samples output by the FFT unit 12. In other words, the minimum interval of the frequency shift by the shift unit 13 is S1/N1. For example, if the frequency fp of the ideal pilot signal 61 is the frequency between frequency samples output by the FFT unit 12, frequency error due to the frequency shift by an integral multiple of S1/N1 will also arise. Accordingly, in the present embodiment, the frequency fp of the ideal pilot signal 61 is set to be the frequency of the frequency sample output by the FFT unit 12. This prevents frequency error caused by the frequency shift by the shift unit 13 being an integral multiple of S1/N1. Note that the frequency fp is the relative frequency difference between the center frequency of the modulated light 50 and the pilot light 51, and thus the transmission apparatus can control the frequency fp to a predetermined value.

On the other hand, to reduce detection error for the frequency of the pilot signal 61 due to the frequency samples being discrete on the frequency axis, it is necessary to narrow the frequency interval of the frequency samples and increase the resolution on the frequency axis. To increase the resolution on the frequency axis, it is necessary to reduce the sampling rate S1 or increase the FFT size N1. However, as mentioned above, the lower limit value of the sampling rate S1 is limited by the bandwidth of the electrical signal. In high-speed communication, the modulation rate is increased, resulting in a wider bandwidth for the electrical signal, and as a result, there is a limit to how low the sampling rate S1 can be set. Additionally, if the FFT size N1 is large, real-time processing becomes difficult, and it is therefore necessary to keep N1 to a size at which real-time processing is possible. In other words, it is not possible to reduce the detection error for the frequency of the pilot signal 61 due to the frequency samples being discrete on the frequency axis.

Figure 3A:
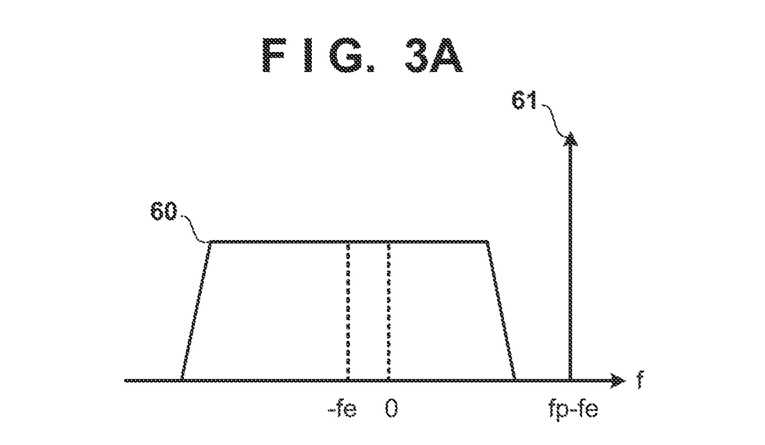
FIG. 3A is a diagram illustrating a signal at each of positions in the reception apparatus according to an embodiment.

In summary, the frequency shift by the shift unit 13 cannot completely compensate for the frequency error fd, and residual error fe arises even after the frequency shift (after the frequency compensation). The residual error fe is caused by the detection error for the frequency of the pilot signal 61 due to the frequency samples output by the FFT unit 12 being discrete, and the maximum value thereof is |S1/(2× N1)|. FIG. 3A illustrates an example of the electrical signal after the frequency shift, output by the shift unit 13. As illustrated in FIG. 3A, the center frequency of the modulated signal 60 is −fe, and the frequency of the pilot signal 61 is fp−fe, resulting in residual error of a frequency fe.

Figure 3B:
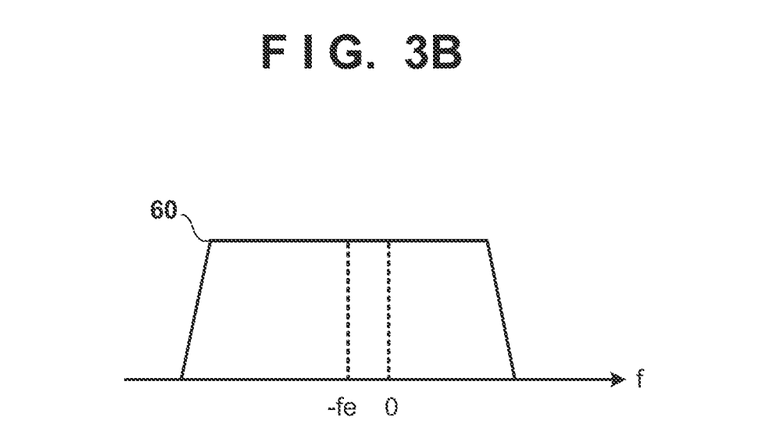
FIG. 3B is a diagram illustrating a signal at each of positions in the reception apparatus according to an embodiment.

A filter unit 14 removes the pilot signal 61 from the electrical signal after the frequency shift, allows only the modulated signal 60 to pass, and outputs the post-filtering modulated signal 60 to an IFFT unit 15. The IFFT unit 15 performs a discrete inverse Fourier transform of the frequency samples of the modulated signal 60 output by the filter unit 14 and outputs time series samples (time samples) to a shift unit 16. Note that the IFFT size of the IFFT unit 15 is N1, which is the same as the FFT size of the FFT unit 12. FIG. 3B illustrates a frequency waveform of the modulated signal 60 output to the shift unit 16. As illustrated in FIG. 3B, the modulated signal 60 has residual error of the frequency fe, and thus to accurately demodulate the modulated signal 60 modulated at multiple levels, it is necessary to further compensate for the residual error fe.

Figure 4A:
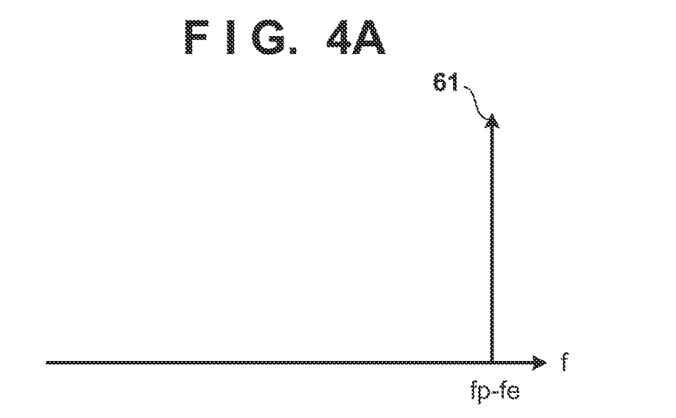
FIG. 4A is a diagram illustrating a signal at each of positions in the reception apparatus according to an embodiment.
Figure 4B:
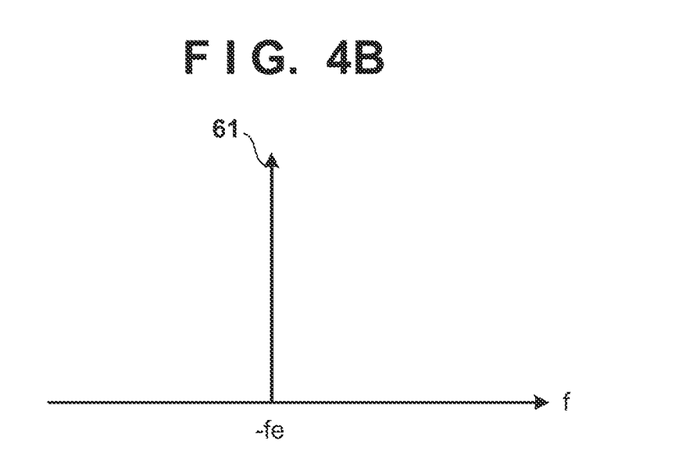
FIG. 4B is a diagram illustrating a signal at each of positions in the reception apparatus according to an embodiment.

A filter unit 17 removes the modulated signal 60 from the electrical signal after the frequency shift, allows only the pilot signal 61 to pass, and outputs the pilot signal 61 to a shift unit 18. FIG. 4A illustrates the pilot signal 61 output to the shift unit 18. The shift unit 18 shifts the frequency of the pilot signal 61 lower by the ideal frequency fp. In other words, the shift unit 18 converts the frequency of the pilot signal 61 to a frequency that is lower by the ideal frequency fp. As mentioned above, the frequency fp is the frequency on the frequency sample output by the FFT unit 12, and thus the frequency shift processing performed by the shift unit 18 does not change the residual error fe. FIG. 4B illustrates the pilot signal 61 output by the shift unit 18. As illustrated in FIG. 4B, the frequency of the pilot signal 61 output by the shift unit 18 is −fe, which corresponds to the residual error.

An IFFT unit 19 performs a discrete inverse Fourier transform on the frequency sample corresponding to the pilot signal 61 output by the shift unit 18 and outputs a time sample. Note that the IFFT size of the IFFT unit 19 is N1, which is the same as the FFT size of the FFT unit 12.

A downsampling (DS) unit 20 downsamples the time sample of the pilot signal 61 output by the IFFT unit 19 at a DS rate R and outputs the resulting sample to an FFT unit 21. In other words, the DS unit 20 performs downsampling by extracting only one of every R time samples output by the IFFT unit 19. Accordingly, a sampling rate S2 of the time samples by the FFT unit 21 is S2=S1/R. In other words, the DS rate R is R=S1/S2, which is a value indicating the ratio of the sampling rate in the FFT unit 12 to the sampling rate in the FFT unit 21.

The FFT unit 21 performs a discrete Fourier transform on the time sample after the downsampling, output by the DS unit 20, and outputs a frequency sample to the shift unit 16. Note that the FFT size in the FFT unit 21 is N2. Note also that, like the FFT size N1, N2 is a size at which real-time processing is possible. The shift unit 16 detects a frequency −fe of the pilot signal 61 on the basis of the frequency sample output by the FFT unit 21. This frequency −fe is the residual error of the modulated signal 60 input from the IFFT unit 15. Accordingly, the shift unit 16 performs frequency compensation by increasing the time sample of the modulated signal 60 by the frequency fe in order to compensate for the frequency error in the modulation signal 60. The shift unit 16 then outputs the modulated signal 60, in which the residual error fe has been compensated for, to a demodulation unit in a later stage (not shown). Through this, the demodulation unit can demodulate the modulated signal 60 with a high level of accuracy. Note that unlike the shift unit 13, the shift unit 18, and the like, the shift unit 16 shifts the frequency in the time domain. This is to eliminate the limitation that the shift can only be made in units of the frequency interval of the frequency sample, and to perform the frequency compensation at any desired frequency quantity.

As described above, the residual error fe of the pilot signal 61 output by the shift unit 13 is determined by the interval between the frequency samples output by the FFT unit 12, and is in a range of −S1/(2×N1) to S1/(2×N1). As such, according to the sampling theorem, it is necessary that the sampling rate S2=S1/R after the downsampling by the DS unit 20 be at least 2×S/(2×N1). R is therefore selected to satisfy the following Formula (1).

$$R = S1/S2 \leq N1 \qquad (1)$$

Additionally, because the downsampling by the DS unit 20 results in the sampling rate S2=S1/R, the interval of the frequency samples output by the FFT unit 21 is S2/N2=S1/(R×N2). Accordingly, even after the shift processing by the shift unit 16, error of S2/(2×N2)=S1/(2×R×N2), which is half of the interval, will still remain. It is necessary that this residual error be less than or equal to a maximum value fm of the permissible value of the frequency error, which is determined by the modulation scheme (simply "permissible value fm" hereinafter). N2 is therefore selected to satisfy the following Formula (2).

$$N2 \geq S2/(2 \times fm) = S1/(2 \times R \times fm) \qquad (2)$$

Furthermore, if the interval S2/N2=S1/(R×N2) of the frequency samples output by the FFT unit 21 is less than or equal to a line width Δf of the continuous light generated by the light source 10, the frequency compensation processing will become unstable due to frequency fluctuations in the continuous light. In other words, N2 is selected to satisfy the following Formula (3) as well.

$$N2 \leq S2/\Delta f = S1/(R \times \Delta f) \qquad (3)$$

As described above, by downsampling at an appropriate DS rate in the DS unit 20 and selecting an appropriate FFT size N2 in the FFT unit 21, residual error in the final modulated signal 60 can be kept less than or equal to fin, and the demodulation of the modulated signal 60 modulated at multiple levels can be performed accurately and in real time.

Specific numerical examples that do not limit the present invention will be given below. On the basis of the frequency band of the electrical signal, the sampling rate S1 is set to 4.096 G/s, and the FFT size N1 in the FFT unit 12 is set to 1024, which makes real-time processing possible. Additionally, the line width Δf of the continuous light generated by the light source 10 is set to 50 kHz, and the permissible value fm of the frequency error is set to 100 kHz.

First, in this case, the frequency sample interval in the FFT unit 12 is 4 MHz. Accordingly, the maximum residual error fe after the shift by the shift unit 13 is 2 MHz, which is greater than the permissible value fm=100 kHz, and cannot be demodulated with good accuracy as is.

On the other hand, from Formula (1) to Formula (3), if N2 and R which satisfy R≤1024 and 20480≤N2×R<81920 are selected, the residual error of the modulated signal 60 will be lower than fm, and the demodulation will be stable regardless of frequency fluctuations in the continuous light. There are multiple combinations of N2 and R that satisfy this condition. N2=256 and R=256, N2=128 and R=512, N2=64 and R=1024, and the like can be given as examples.

Second Embodiment

Figure 5:
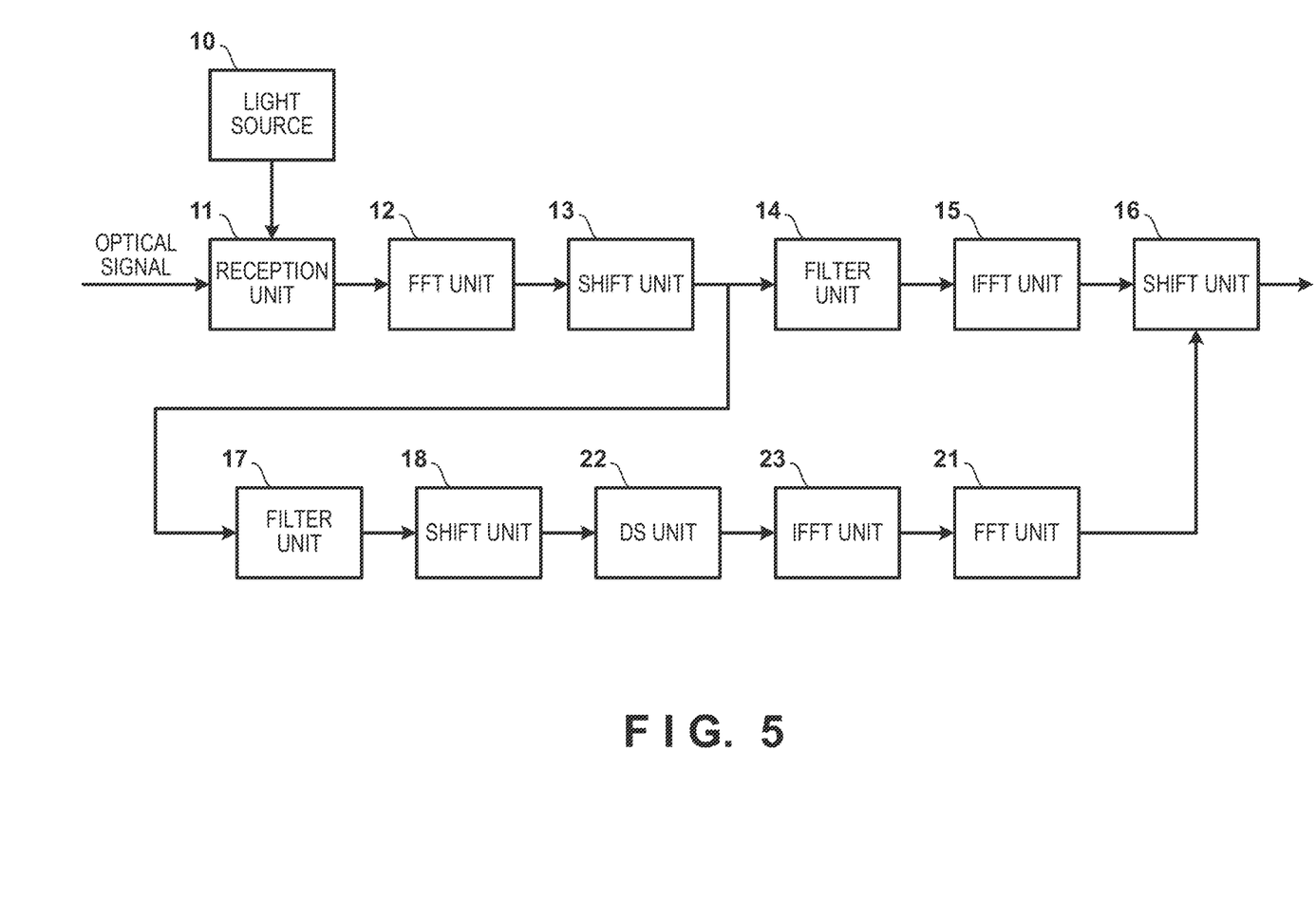
FIG. 5 is a block diagram of a reception apparatus according to an embodiment.

A second embodiment will be described, focusing on the differences from the first embodiment. FIG. 5 is a block diagram of a reception apparatus according to the present embodiment. Note that function blocks that are the same as those of the reception apparatus of the first embodiment illustrated in FIG. 1 are given the same reference signs, and will not be described.

In the first embodiment, after the frequency shift by the shift unit 18, the pilot signal 61 was converted back to a signal in the time domain by the IFFT unit 19, and downsampling was then performed by the DS unit 20. In the present embodiment, after the frequency shift by the shift unit 18, downsampling is performed in the frequency domain before converting the signal to the time domain. Accordingly, a DS unit 22 selects a predetermined number of consecutive frequency samples, including DC (frequency 0), from the frequency samples output by the shift unit 18. Note that the frequency samples selected by the DS unit 22 are an even number to enable conversion to time samples by an IFFT unit 23 in a later stage. Specifically, when selecting a total of 2Q frequency samples (where Q is an integer greater than or equal to 2), the DS unit 22 selects the frequency sample corresponding to DC, Q consecutive samples on the positive frequency side from the frequency sample corresponding to DC, and (Q−1) consecutive frequency samples on the negative frequency side.

The IFFT unit 23 performs a discrete inverse Fourier transform on the frequency sample selected by the DS unit 22, and outputs a time sample. Note that the IFFT size of the IFFT unit 23 is 2Q, which is the same as the number of frequency samples selected by the DS unit 22. For example, if the FFT size in the FFT unit 12 is 1024 and 2Q is 4, the time sample output by the IFFT unit 23 is the same as the time sample output by the DS unit 20 in the first embodiment when the DS rate R is 256. Accordingly, in the same manner as in the first embodiment, the shift unit 16 can make the residual error lower than the permissible value fm on the basis of the frequency samples output by the FFT unit 21. Note that N/2Q corresponds to the DS rate R in the first embodiment.

In each of the above-described embodiments, the shift unit 13 and the shift unit 18 shift the frequency in units of the frequency interval of the frequency sample, and thus the frequency fp, which is the difference between the center frequency of the modulated light 50 and the frequency of the pilot light 51, is used as the frequency of the frequency sample output by the FFT unit 12. However, if a shift of any desired frequency quantity can be performed, e.g., by first converting the signal to a signal in the time domain, there is no need to make the frequency fp the frequency of the frequency sample output by the FFT unit 12.

The processing downstream from the reception unit 11 of the reception apparatus according to the present invention can be performed by having an appropriate program executed by one or more processors. In other words, the present invention can be realized by a computer program that, when executed by one or more processors of an apparatus having the one or more processors, causes the apparatus to operate as the reception apparatus described above. The computer program may be stored in a computer-readable storage medium, or may be distributed over a network.

The invention is not limited to the foregoing embodiments, and various variations/changes are possible within the spirit of the invention.

What is claimed is:

1. A reception apparatus comprising:
a receiving unit configured to coherently detect, based on local light, an optical signal containing modulated light and pilot light, and output an electrical signal containing a modulated signal corresponding to the modulated light and a pilot signal corresponding to the pilot light;
a first compensating unit configured to detect a frequency of the pilot signal by performing a discrete Fourier transform of the electrical signal output by the receiving unit, and determine and compensate for frequency error in the electrical signal based on error in the frequency detected relative to a reference frequency;
a frequency converting unit configured to convert the frequency of the pilot signal after the compensating by the first compensating unit such that the frequency of the pilot signal is lowered by the reference frequency; and
a second compensating unit configured to determine frequency error in the modulated signal after the compensating by the first compensating unit by performing a discrete Fourier transform on the pilot signal after the frequency converting and detecting a frequency of the pilot signal after the frequency converting, and compensate for the frequency error in the modulated signal after the compensating by the first compensating unit.

2. The reception apparatus according to claim 1,
wherein the first compensating unit includes a first discrete Fourier transform unit configured to perform a discrete Fourier transform on time samples obtained by sampling the electrical signal output by the receiving unit at a first sampling rate and,
the second compensating unit includes a second discrete Fourier transform unit configured to perform a discrete Fourier transform on time samples obtained by sampling the pilot signal after the frequency converting by the frequency converting unit at a second sampling rate, and
a ratio of the first sampling rate to the second sampling rate is less than or equal to a transform size of the first discrete Fourier transform unit.

3. The reception apparatus according to claim 2,
wherein a transform size of the second discrete Fourier transform unit is greater than or equal to a value obtained by dividing the second sampling rate by a value based on a permissible value of frequency error remaining in the modulated signal after the compensating by the second compensating unit.

4. The reception apparatus according to claim 3, wherein the value based on the permissible value is a value twice the permissible value.

5. The reception apparatus according to claim 2, wherein the transform size of the second discrete Fourier transform unit is less than or equal to a value obtained by dividing the second sampling rate by a line width of the local light.

6. The reception apparatus according to claim 2, wherein the reference frequency is a frequency in a frequency sample output by the first discrete Fourier transform unit.

7. The reception apparatus according to claim 2, further comprising:
a rate converting unit configured to convert the first sampling rate to the second sampling rate,
wherein the rate converting unit is further configured to convert the first sampling rate to the second sampling rate in a frequency domain.

8. The reception apparatus according to claim 2, further comprising:
a rate converting unit configured to convert the first sampling rate to the second sampling rate,
wherein the rate converting unit is further configured to convert the first sampling rate to the second sampling rate in a time domain.

9. A non-transitory computer readable medium stores a program that, when executed by one or more processors of a reception apparatus having receiving unit configured to coherently detect, based on local light, an optical signal containing modulated light and pilot light, and output an electrical signal containing a modulated signal corresponding to the modulated light and a pilot signal corresponding to the pilot light, causes the one or more processors to execute:

first compensating processing of detecting a frequency of the pilot signal by performing a discrete Fourier transform of the electrical signal output by the receiving unit, and determining and compensating for frequency error in the electrical signal based on error in the frequency detected relative to a reference frequency;

frequency converting processing of converting the frequency of the pilot signal after the compensating by the first compensating processing such that the frequency of the pilot signal is lowered by the reference frequency; and second compensating processing of determining frequency error in the modulated signal after the compensating by the first compensating processing by performing a discrete Fourier transform on the pilot signal after the frequency converting processing and detecting a frequency of the pilot signal after the frequency converting processing, and compensating for the frequency error in the modulated signal after the compensating by the first compensating processing.

* * * * *